Figure 1:
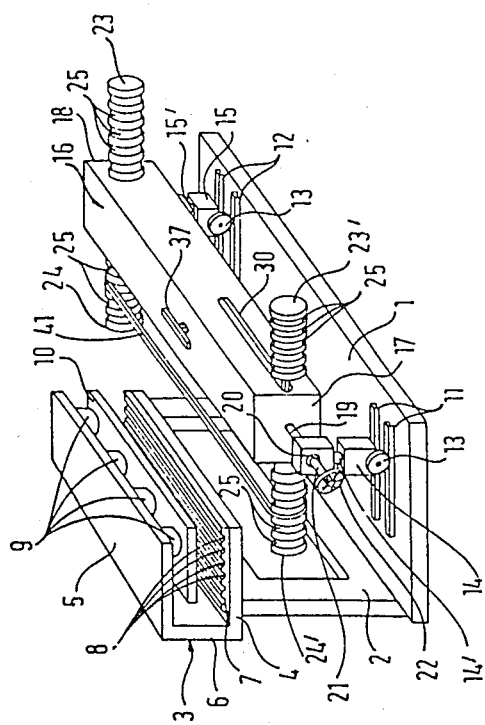

United States Patent [19]

Maffeis et al.

[11]  4,302,167

[45]  Nov. 24, 1981

[54] APPARATUS FOR CURING POWER TRANSMISSION BELTS

[75] Inventors: Flavio Maffeis; Fulvio Franchino, both of Milan, Italy

[73] Assignee: Industrie Pirelli S.p.A., Milan, Italy

[21] Appl. No.: 10,491

[22] Filed: Feb. 8, 1979

[51] Int. Cl.$^3$ .................. B29H 7/22; B29D 29/00
[52] U.S. Cl. .................. 425/28 B; 425/394
[58] Field of Search .................. 425/28 B, 394, 445

[56] References Cited

U.S. PATENT DOCUMENTS

| | | | |
|---|---|---|---|
| 2,867,845 | 1/1959 | Sauer | 425/28 B |
| 3,482,004 | 12/1969 | Anderson | 425/28 B X |
| 3,700,365 | 10/1972 | Spicer | 425/28 B |

*Primary Examiner*—J. Howard Flint, Jr.
*Attorney, Agent, or Firm*—Stevens, Davis, Miller & Mosher

[57] ABSTRACT

An apparatus for heating segments of an endless belt made from a heat cross-linkable elastomer has a frame comprising a flat rectangularly shaped base member and a generally "C-shaped" heated enclosure supported above the base member. The C-shaped enclosure has a second base member and a top member disposed in vertically spaced relation with an upstanding side member supporting the top member above the second base member. Facing heated plates are supported by the second base member and the top member and can be moved together. A box-like housing has a pair of longitudinally spaced grooved cylindrically shaped members to support a looped belt to be cured. The box-like housing is mounted on wheels supported on rails on its first base member for moving a belt supported thereon into the enclosure with the upper reach of the belt between the heated plates for cross-linking. The belt while supported on the cylindrically shaped members is shielded from heat when disposed outside of the box-like housing.

6 Claims, 2 Drawing Figures

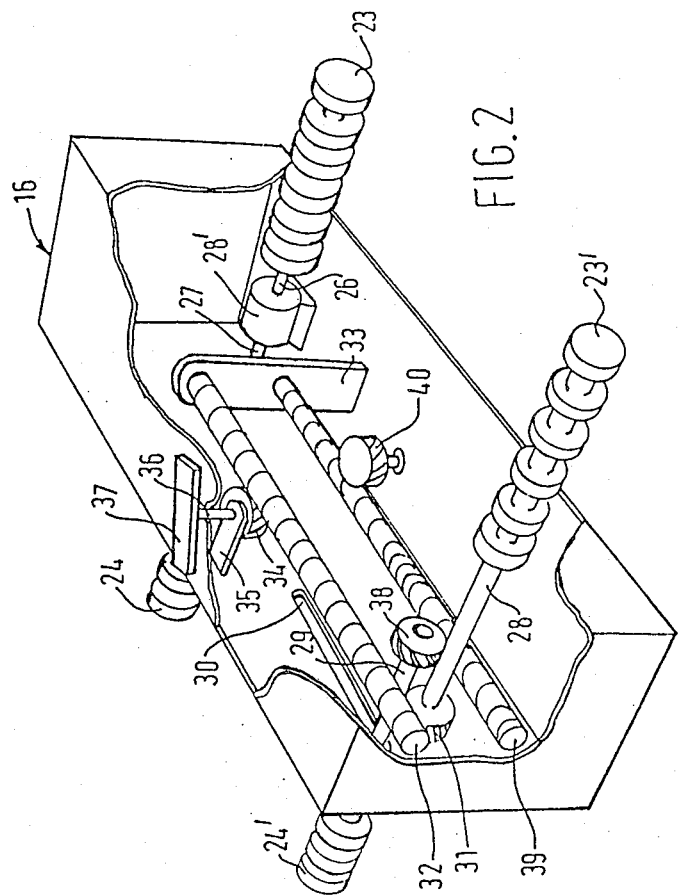

APPARATUS FOR CURING POWER TRANSMISSION BELTS

This invention relates to an apparatus for curing power transmission belts comprising a cross-linkable elastomeric material and, in particular, to trapezoidal driving belts of high development of cross-linkable material.

Various kinds of apparatus for curing power transmission belts such as trapezoidal shaped power transmission belts are known.

These known devices can be classified as two fundamental types. A first type has an annular mold of rigid material within which the belt to be cured or cross-linked is inserted and the mold is then placed in an autoclave to cure or cross-link the cross-linkable material forming the belt. Devices of this type, that is molds, are used for curing belts of small dimensions, that is to say, in practice, for curing belts having a maximum dimension of up to about 1,400 cm.

For curing belts of greater dimensions the just above briefly described curing molds become so heavy and cumbersome that it is difficult to transfer them to an autoclave or curing oven.

A second known type of device for curing power transmission belts which is employed for curing larger belts has two heated flat plates mounted on a support. One of the flat plates is usually fixed to the support and usually includes at least one groove having its cross-section of the same shape and size as those of the belts, while the other flat plate is smooth and movable and can be drawn near or apart from the fixed flat plate by means of cylinder-piston assemblies connecting the movable flat plate to the support.

In a device of this second type, the belt to be cured is mounted on a pair of cylinders, one of which is freely rotating on a support, while the other is driven, that is to say, is provided with means to make it rotate around its own axis. The cylinders are, moreover, disposed so that a portion of the belt, during the curing phase is inserted in the grooves of the heated fixed plate.

With this second type of known device the belts are cured portion by portion by means of the flat heated plates.

The known devices of the second type, to which the one according to the present invention relates, have several inconveniences or disadvantages. For example, after curing and drawing out the belts from the cylinders, they exhibit sensible differences in the development and a considerably lower effective lifetime than the one theoretically achievable and, above all, a considerable lack of uniformity in the lifetime of the belts. Moreover, since in the belt drives which employ belts of relatively large size or development, at least two belts are used in the same drive, this lack of uniformity in the lifetime of the belts is greatly emphasized.

Such variations in the development of the belts cured with the second type of device are due to the withdrawals of the tension resistant insert member such as a cord, especially in the case in which the tension resistant insert member is of a thermally unstable material, and, in particular, is of a heat-shrinkable plastic material, such as, for example, polyester or the like.

To solve this inconvenience it is already known to provide for cooling of the cured belts by means of water-spouts so as to accelerate the cooling while the belts are mounted on the cylinders. Operating in this way it has been found that the belts cured with the second type of devices still have variations in their development and are not entirely satisfactory because of their non-uniform lifetime and, moreover, because they have an outer irregular surface. Incrustations on the flat plates due to the limestone contained in the water are also present and cleaning of the flat plates is often required in order to avoid variations in the dimensions of the cross-section of the belts. To solve the problem of the unsatisfactory and non-uniform lifetime of the belts a machine which effects a treatment of the already cured belts by tensioning, heating and successively cooling them while they are in tension has been proposed, but the problem has not been solved in this way.

An object of this invention is to provide a device for curing large development transmission belts which is devoid of the disadvantages of the heretofore available curing apparatus. Another object of the invention is to provide an apparatus for curing power transmission belts to provide belts having a uniform development, a uniform and long lifetime and which, in practice, does not require the cleaning of the flat plates. Still another object of the present invention is to increase the productivity of the previously described second type of known curing apparatus.

Other objects will become apparent from the following description with reference to the accompanying drawing wherein FIG. 1 is a perspective view of one embodiment of the invention; and FIG. 2 illustrates in perspective an enlarged detail of the embodiment of FIG. 1.

The foregoing objects of the invention are accomplished by providing a device for curing power transmission belts comprising a pair of flat heated plates provided with at least one groove having a cross-section which conforms to the cross-section of the belt, means for moving one plate against the other plate and for drawing the plates apart from each other and means for moving at intervals the belts between the flat plates characterized by the fact that the apparatus comprises means for supporting and keeping the belt under tension during the curing phase and during the cooling of the cured belt outside the flat plates and for protecting the cured belts from the thermal radiations emitted by the flat heated plates.

Referring now to FIG. 1 one embodiment of a device according to the invention for curing trapezoidal power transmission belts of reticulable or cross-linkable material is illustrated.

As can be seen in FIG. 1, the illustrated device includes a base member 1 consisting of a rectangular plate laid on the ground. A mounting or upright panel member 2 is fixed substantially perpendicularly to base 1. A C-shaped frame 3 is fixed to the upper edge of panel member 2. C-shaped frame 3 has wings 4 and 5 joined with each other by a side member 6. On the face of the wing 4 facing the wing 5 there is a heated plate 7, namely a plate having in its inside a series of cavities within which a hot fluid such as, for example, saturated steam is circulated.

The surface of the face of the plate 7 which is not in contact with the wing 4 of the frame 3 has a series of grooves 8, parallel to one another and to the side member 6 of the frame 3, which in their cross-section have the form of the section of the belt to be cured.

To the face of the wing 5 facing the wing 4 are connected a plurality of hydraulically actuated cylinder-piston assemblies 9 to which, in their turn, a flat heated plate 10 is connected. Plate 10 is provided in its inside with a series of cavities in which a hot fluid such as, for example, saturated steam is circulated.

Moreover, on the base member 1 there are two longitudinally spaced pairs of rails 11 and 12 disposed perpendicular to the side of the rectangular plate forming the base 1 from which the mounting 2 is set.

On the two pairs of rails 11 and 12 rest, by means of wheels 13, respectively, supporting posts 14 and 15. Supporting posts 14 and 15 are part of a rotating support consisitng, in this particular embodiment represented in FIG. 1 of a box-shaped enclosure housing 16, having a prismatic form, which at the bases 17 and 18 carries two projecting shafts 19, which are inserted in holes 20 made in supporting posts 14 and 15 so as to allow the rotation of shafts 19 within holes 20. Moreover, the shaft 19 which is inserted in the hole 20 of post 14 has an elongated portion 21 which is connected to a wheel 22 to effect the rotation of the box-shaped member 16. Furthermore, posts 14 and 15 have two parts joined to each other, respectively, by means of pistons 14' and 15', hydraulically operated, to vary the length of the said posts 14 and 15 and, consequently, the distance of the box-shaped member 16 from the member 1.

The rotating support of the box-shaped member 16 provides, projecting from the same, at least one pair of cylinders and in the particular embodiment represented in FIG. 1 two pairs of cylinders 23, 23' and 24, 24'.

The axes of the cylinders 23 and 23' are parallel to each other and define a plane which preferably passes through the axis of rotation of the box-shaped member 16, although it is not necessary that the plane pass through the axes of rotation of member 16. This plane is different from the plane defined by the axes, parallel to each other, of the pair of cylinders 24, 24' which, preferably but not necessarily, also passes through the axis of rotation of the box-shaped member 16.

Obviously, there may be more than two pairs of cylinders and the fact that the embodiment illustrated in FIG. 1 provides only two pairs of cylinders 23, 23', 24, 24' is not intended as a limitation.

The cylinders 23, 23', 24 and 24' are similar to one another and provide on their surfaces of revolution a series of circumferential grooves 25, the cross-section of which has the form of the cross-section of the uncured power transmission belts to be cured.

The general idea of the invention is to provide a device for curing belts which includes means for supporting and keeping under tension the belt to be cured during the curing phase. The curing takes place by means of the flat heated plates 7 and 10, and during the cooling of the cured belt outside the plates, the cured belts are protected from the thermal radiations emitted by the flat heated plates.

One embodiment of the general means finds a concrete application in the presence within the device of the rotating support and, in particular, of the rotating support formed by the box-shaped housing 16 and by the previously described pairs of cylinders 23, 23' and 24, 24'.

The device provided by the invention comprises, moreover, in its more general form means for varying the distance between the axes of each pair of cylinders; a particular embodiment of the just above described means is illustrated in FIG. 2. As can be seen in FIG. 2, the box-shaped member 16 is an enclosure or housing of metallic sheet from which the cylinders 23, 23' and 24, 24' are projecting.

The cylinders 23 and 24 are mounted, respectively, on shafts 26 and 27 which are set from a motor 28' enclosed within the box-shaped housing 16.

The cylinders 23' and 24' are supported, respectively, by the shafts 28 and 29 and such cylinders freely rotate on the shafts 28 and 29. Shafts 28 and 29 have a portion projecting from the cylinders which in cross-section has the form of a prismatic bar so as to be encased within slots 30 made in the walls of the box-shaped member 16, slots 30 forming a guide fixed to the rotating support for the prismatic bar. Furthermore, shaft 28 of the cylinder 23' is firmly engaged with a toothed wheel 31, engaging, in its turn, with a worm screw 32, which at one of its end is connected to as to be able to rotate around its own axis in a bushing (not represented), joined to the box-shaped housing 16 while the other end of worm screw 32 engages, so as to be able to rotate around its own axis, with a support 33 projecting from the inner surface of the box-shaped housing 16. Moreover, the worm screw 32 engages with a toothed wheel 34, supported by a bracket 35 projecting inside the box-shaped housing 16, the rotating shaft 36 of which projects from the said box-shaped housing 16, and to which is connected the operating hand grip 37.

Also the shaft 29 of the cylinder 24' is firmly engaged with a toothed wheel 38 which in turn engages with a worm screw 39. Screw 39 at one of its ends is connected, so as to be able to rotate around its own axis, in a bushing (not shown) joined to the box-shaped member 16, while the other end of the worm screw 39 engages, so as to be able to rotate around its own axis, with the previously mentioned support 33. Moreover, the worm screw 39 engages with a toothed wheel 40 similar to the toothed wheel 38, also provided with an operating hand grip which is not visible in the drawing.

The device of the present invention operates in the following manner. Starting from the position in which the device is represented in FIG. 1, supposing that the belts 41 (only one of which is represented in FIG. 1) mounted on the pair of cylinders 24, 24' are uncured and that on the pair of cylinders 23 and 23' there are no belts, to be able to cure the belts 41 the assembly formed by the box-shaped housing 16 is drawn near the flat heated plates 7 and 10, making the supporting posts 14 and 15 move on the pairs of rails 11 and 12 by means of the wheels 13, so as to position the upper branch of the belts 41 between the flat heated plates of the press and inserting the portion of the upper branch of said belts 41, included between the flat plates, within the grooves 8 of the flat plate 10. In order to effect the insertion into the grooves 8 of the flat plate 10 of the portions of the upper branches of the belts 41 during the motion of the box-shaped enclosure 16 towards the flat heated plates, the length of the posts 14 and 15 by operating the pistons 14' and 15' has been increased so as to allow the insertion of the upper branches of the belts 41 between the flat heated plates and, subsequently, still by operating the pistons 14' and 15' the length is reduced, causing with the reduction the insertion of a portion of the upper branches of the belts 41 within the grooves 8. At this point the flat heated plate 10 is lowered and pressed against the flat plate 7 so as to supply heat and pressure to the elastomeric material forming the branch of the belts 41, inserted in the grooves 8.

While the machine effects this operation and, independently of it, the operation of toothed wheel 35 by means of the hand grip 37 causes rotation of the worm screw 32 around its own axis and forces the toothed wheel 31 to roll along the worm screw towards the cylinder 23. Toothed wheel 31 is guided and moved by the coupling between the prismatic shaft 28 and the slot 30. The approaching movement of the toothed wheel 31 to the cylinder 23 causes cylinder 23' to approach cylinder 23, because cylinder 23' is connected to the prismatic shaft 28.

After cylinders 23 and 23' are caused to approach each other, uncured belts are disposed on them. After disposing the uncured belts between the cylinders 23 and 23' the drawing apart of the cylinder 23' from the cylinder 23 is effected by rotating the hand grip 37 in the direction opposite to the one with which the approaching of the said cylinder 23' to the cylinder 23 had been caused so as to tension the belts mounted on the said pair of cylinders 23 and 23'.

While the just above described operation for the cylinders 23 and 23' are effected, the curing of the portions of belts 41 mounted on the pair of cylinders 24, 24' and included within the grooves 8 of the flat heated plate 7 takes place. At the end of the curing phase of the just above described portion of belts 41 the opening of the flat heated plates, that is the drawing apart of the flat plate 10 from the flat plate 7 is effected by operating the cylinder-piston assemblies 9. After the opening of the flat plates, the motor 28' sets cylinder 24 into rotation, makes the portion of the branch of belts 41, already cured, which is placed within the grooves 8 of the flat heated plate 7, to slide and introduces in grooves 8 the subsequent and still uncured portion of the belts 41.

As soon as a new uncured portion of the belts 41 is introduced within the grooves 8, the motor 28' is stopped and, consequently, cylinder 24 stops also. At this point the flat heated plate 10 is pushed by the cylinder-piston assemblies 9 against the flat heated plate 7 so as to supply heat and pressure to the portion of uncured belts 41 which is placed in the grooves 8. The just now described operation is repeated until the belts 41 have been thoroughly cured.

As soon as the belts 41 are thoroughly cured the flat heated plate 10 is withdrawn from the flat heated plate 7, those portions of the belts 41 which are cured last and are present in the grooves 8 are withdrawn from the grooves by increasing, by means of the pistons 14' and 15', the length of the posts 14 and 15 and the pair of cylinders 24, 24' is drawn away from the flat heated plates making the posts 14 and 15 and, consequently, the box-shaped enclosure 16 slide on the pairs of rails 11 and 12 by means of wheels 13.

At this point, rotation of the box-shaped member 16 around the posts 14 and 15 is caused by operation of wheel 22. By doing so, the cylinders 23, 23' with the uncured belts mounted on them are carried in front of the flat heated plates and the cylinders 24, 24', supporting the already cured belts, away from the said flat heated plates, interposing, moreover, between the cured belts and the flat heated plates the box-shaped member 16 which therefore also functions as a screen against the thermal radiations emitted by the flat heated plates.

At this point the box-shaped member 16 is drawn once again near the flat heated plates so as to insert the upper branch of the belts between the flat plates. The length of the posts 14 and 15 is reduced by operating the pistons 14' and 15' so as to introduce a portion of the upper branch of the uncured belts into the grooves 8.

The flat heated plate 10 is lowered and pressed against the flat heated plate 7 to cure the portions of belts placed between the flat heated plates.

Therefore, the curing of portion by portion of the uncured belts is effected by means of the previously described steps. While curing the uncured belts by means of the flat heated plates, the already cured belts 41 are cooled uniformly and remain stretched out on the cylinders 24, 24' which support them.

Shortly before thoroughly curing the belts, the cylinder 24' is drawn near the cylinder 24 by means of the hand grip which controls the gear 40 and the already cured and now also cold belts mounted on said cylinders 24, 24' are taken away.

Other uncured belts are disposed on the pair of cylinders 24, 24' and, by means of the hand grip which controls the gear 40, the cylinder 24' is drawn away from the cylinder 24 so as to tension the just mounted uncured belts.

At this point the previously described operations for drawing the uncured belts away from the flat heated plates 7 and 10 and for curing the uncured belts carried by the pair of cylinders 24, 24' are repeated.

According to a further embodiment, not shown in the figures, of a device according to the present invention, which, with respect to the embodiment described in detail, provides a higher productivity, three heated flat plates are used. This device has two smooth surfaced flat heated plates and a flat heated plate, placed between the other two, which is provided on both faces with grooves having in their cross-section the form of the cross-section of the belts to be cured. Furthermore, both the intermediate flat plate and one of the two smooth surface flat plates are movable by means of cylinder-piston assemblies so as to allow the two smooth surfaced flat plates to press against the faces of the flat grooves intermediate plate. All the other parts of the device according to the above mentioned further embodiment are the same as those of the embodiment illustrated and described in detail.

As regards the operation of this further embodiment of the invention having three plates, it is the same as the operation of the embodiment described in detail above except for the fact that the three flat heated plates cure pairs of distinct portions of each belt at the same time.

From the description of the device according to the present invention and from the description of its operation it can be easily understood that it allows to achieve all of the proposed objects. In fact, the achievement of an equality in the development of the belts cured with a device according to the present invention can be explained by means of the fact that after the curing phase the belts remain stretched out and tensioned between the pair of cylinders on which they have been cured.

The achievement of a constant, uniform and long lifetime of the belts can be explained by means of the fact that, thanks to the presence of the rotating support on which the supporting cylinders of the belts are mounted, the belts can be drawn away from the flat heated plates and, therefore, the latter cannot alter the uniformity of the cooling of the belts, also owing to the fact that the rotating support has the function, with its presence, of a protective screen against the thermal radiations emitted by the flat heated plates. The protection of the belts from the radiations emitted by the flat heated plates, in fact, avoids cooling of portions of the belts to different temperatures with a consequent presence in the development of each cured and cold belt of portions, of different lengths and in different positions from one belt to another with the result that single belts have an unrecognizable, unstable and non-uniform elastic behavior. Finally, the high productivity of the device provided by the present invention is evident if it is considered that such a device does not have working down times because it allows, while curing a group of belts, the cooling of the just before cured group of belts, the assembling of the belts to be cured and the disassembling of the cured belts without interruption of the curing cycle.

Although the invention has been described in detail for the purpose of illustration it is to be understood that such detail is solely for that purpose and that variations can be made by those skilled in the art without departing from the invention except as it may be limited by the claims.

We claim:

1. A device for curing power transmission belts comprising a pair of flat heated plates provided with at least one groove having in its cross-section the form of the cross-section of the belt, means for moving one of said plates against the other and for drawing the plates apart from each other, and means for moving at intervals said belts between the said flat plates comprising means for supporting and keeping said belt under tension during the curing phase and during the cooling of the cured belt outside of the said plates and for protecting said cured belt from the thermal radiations emitted by the said flat heated plates.

2. The device of claim 1 wherein the means for supporting and keeping in tension the belts during the curing phase and during the cooling of the cured belts comprises at least one pair of cylinders provided with grooves having a cross-section which conforms to the cross-section of the belts, the cylinder of each pair having their axes parallel and coplanar to each other and the plane defined by the axes of a pair of cylinders being different from the plane defined by the axes of the other pair, said pairs of cylinders being supported on a rotating support, the axis of rotation of which is parallel to the flat plates and is provided with means for drawing near and away with respect to the flat plates the pair of cylinders adjacent to the latter, and means for effecting the rotation of the rotating support, said rotating support forming a protective screen against thermal radiations emitted by said plates.

3. The device of claim 2 wherein the means for drawing near and away with respect to the flat plates the pair of cylinders adjacent to the latter comprises rails, fixed with respect to one of the flat plates, and wheels firmly connected to posts projecting from the rotating support which bears the said pairs of cylinders.

4. The device of claim 2 or claim 3 wherein means is provided for effecting the variation of the distance between the cylinders of each pair of cylinders.

5. The device of claim 4 wherein the means for effecting the variations of the distance between the cylinders of each pair of cylinders comprises a worm screw disposed parallel to the axis of the rotating support for the cylinders, a toothed wheel engaging with the worm screw, a prismatic bar connecting the toothed wheel to one of the cylinders of at least one pair of cylinders, said prismatic bar being freely rotating with respect to the toothed wheel and to the cylinder, and a guide fixed to the rotating support for the said prismatic bar.

6. An apparatus for curing an endless cross-linkable elastomeric belt comprising a rectangularly shaped base member having opposite side edges and opposite end edges, a generally box-shaped housing having a bottom member, an opposite top member spaced above the bottom member, and a substantially vertical side member secured along one edge to the bottom member and along its opposite edge to the top member thereby supporting the top member above the bottom member, said housing having an open side opposite its said side member and having two open ends, a first heated plate supported on the bottom member and facing said top member, laterally spaced longitudinally extending grooves in said first heated plate having a cross-section conforming to the cross-section of the belt to be cured, a plurality of piston and cylinder assemblies secured to said top member and depended therefrom towards said first heated plate, a second heated plate fixed to said pistons between the top member and the first heated plate, hydraulic means for moving the pistons in the cylinders and thereby moving said second heated plate to and from the first heated plate, pairs of laterally extending rails longitudinally spaced on the said base member, an upstanding panel secured to the base member and supporting the box-like housing above the base member, means comprising wheels rotatably disposed on said rails and supporting posts secured to the box-like housing and supported by said wheels for moving said box-like housing towards and away from said panel, a pair of longitudinally spaced cylindrically shaped members extending outwardly from said box-like housing and having grooves in the surface thereof adapted for insertion of a belt to be cured therein to support a belt looped about said cylindrically shaped members with an upper reach and a lower reach whereby the upper reach becomes disposed in the grooves in said first heated plate when the box-like housing is moved towards said upstanding panel, said box-like housing being rotatable into a position whereby it shields the belt from heat when the belt is outside the enclosure of the box-like housing after curing, and means for moving said cylindrically shaped members towards and away from each other to place a belt looped thereabout under tension.

* * * * *